(12) United States Patent
Hefner

(10) Patent No.: US 6,394,786 B1
(45) Date of Patent: May 28, 2002

(54) MOLD FOR INJECTION MOLDING

(75) Inventor: Christian Hefner, Wels (AT)

(73) Assignee: Hefner Elastomere Verarbeitung GmbH, Wels (AT)

( * ) Notice: Subject to any disclaimer, the term of this patent is extended or adjusted under 35 U.S.C. 154(b) by 0 days.

(21) Appl. No.: 09/580,574

(22) Filed: May 30, 2000

(30) Foreign Application Priority Data

May 28, 1999 (AI) .............................................. 374/99 U

(51) Int. Cl.[7] .............................................. B29C 45/40
(52) U.S. Cl. ........................ 425/556; 264/334; 425/441; 425/443
(58) Field of Search ................................ 425/438, 441, 425/443, 444, 556; 264/334

(56) References Cited

U.S. PATENT DOCUMENTS 5,622,736 A * 4/1997 Brown et al. ............... 425/556

FOREIGN PATENT DOCUMENTS

EP 0108333 A2 5/1984

* cited by examiner

Primary Examiner—Tim Heitbrink
(74) Attorney, Agent, or Firm—Young & Thompson

(57) ABSTRACT

The mold includes two die plates at least one backing plate held between the two die plates, and border at least one mold cavity, and a device for opening the mold and lifting the backing plate from the die plates. One die plate can be moved in one plane at right angles to the direction of motion of the backing plate and on this die plate there are ejectors for the injection moldings. The ejectors are offset laterally to the mold cavities in the backing plate, i.e. the ejectors in the closed state of the mold lie next to the mold cavities.

18 Claims, 2 Drawing Sheets

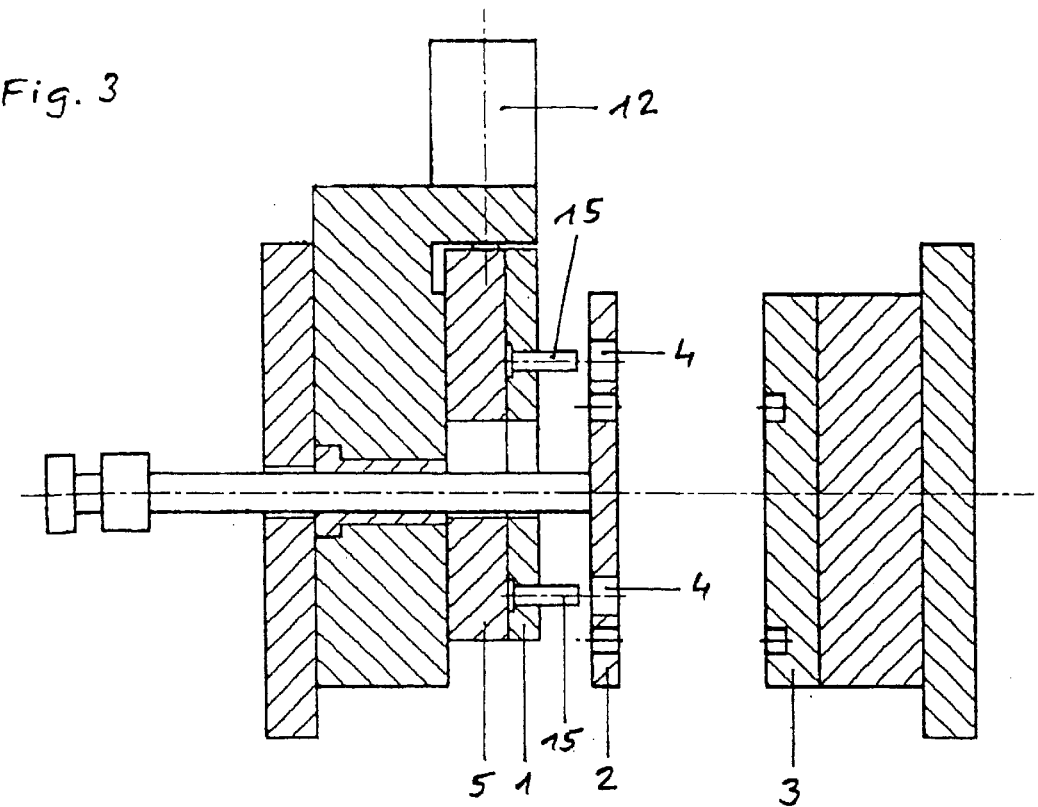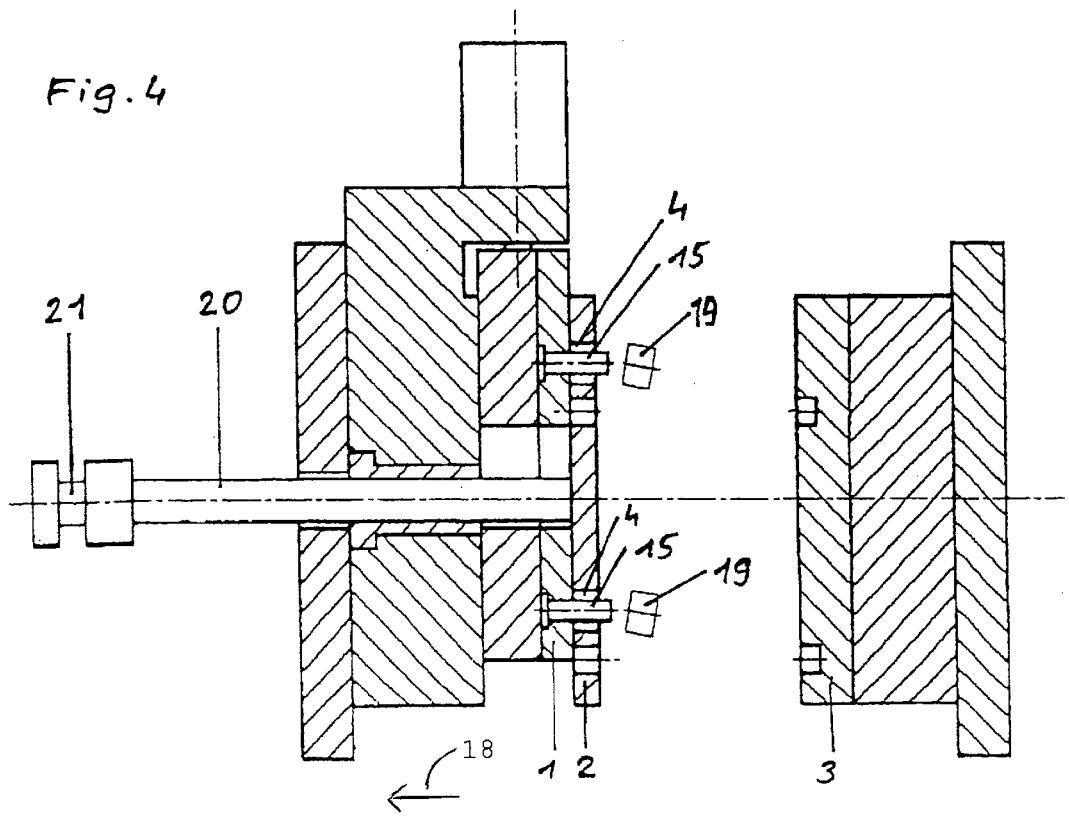

MOLD FOR INJECTION MOLDING

FIELD OF THE MOLDING INVENTION

The invention relates to an injection mold.

BACKGROUND OF THE INVENTION

Injection molds are known which have two die plates and at least one backing plate which is held between these die plates, the injection moldings produced being held in the backing plate after the mold is opened. To eject the moldings from the backing plate the mold must be opened so wide that from the outside an ejector plate on which ejector pins are located can be inserted between the backing plate and one die plate. After placement of the ejector plate, the backing plate is moved against the ejector plate with the pins, the injection moldings being pressed by the pins out of the backing plate. Thereupon the backing plate must again be moved forward to be able to move the ejector plate out of the mold. Then the mold is closed again. The described processes dictate a relatively high cycle time since on the one hand the mold must be opened relatively wide to create enough space for collision-free insertion of the injector plate and also insertion and removal of the ejector plate due to the very large stroke takes a large amount of time.

SUMMARY OF THE INVENTION

The object of the invention is to devise a generic mold in which the cycle times can be shortened.

In the invention the ejectors are no longer attached to an ejector plate, but directly to a die plate. The ejectors are offset laterally to the mold cavities in the backing plate, i.e. the ejectors in the closed state of the mold lie next to the mold cavities.

To eject the injection moldings then it is simply necessary to open the mold so far or to raise the backing plate so far from the die plate with the ejectors that they are free, to push the die plate by the relatively small amount of the lateral offset of the ejectors relative to the mold cavities and to withdraw the backing plate, by which the ejectors are pushed into the mold cavities on the backing plate and the injection moldings are ejected. It is apparent that the lift paths which are necessary in the mold as claimed in the invention for ejecting the injection moldings are much smaller than in the prior art so that the cycle times can be greatly shortened.

Basically two versions for placing the ejectors on the die plate are preferred. On the one hand, it is possible for the ejectors to be pins which are rigidly attached to the die plate and for there to be recesses for the pins on the backing plate and optionally on the second die plate. But on the other hand it is also possible for the ejectors to be pins which are movably held in the die plate elastically in the direction of motion of the backing plate.

The first embodiment has the advantage that the ejectors are attached to the die plate in a relatively simple manner. To do this it is necessary to provide recesses for the ejectors in the backing plate and, depending on the length of the pins, optionally in the opposite die plate; the pins are held in the recesses when the mold is closed.

In the second embodiment, recesses in the backing plate and the opposing die plate are not necessary; for this reason a somewhat higher cost for the elastic support and guidance of the pins in the die plate must be tolerated.

BRIEF DESCRIPTION OF THE DRAWINGS

Other features and advantages of the invention follow from the description of one embodiment of the invention below with reference to the drawings.

FIG. 3 shows the mold in the opened state shortly before ejecting the injection moldings and FIG. 4 shows the mold in the opened state during ejection of the injection moldings.

DETAILED DESCRIPTION OF THE INVENTION

Figure 1:
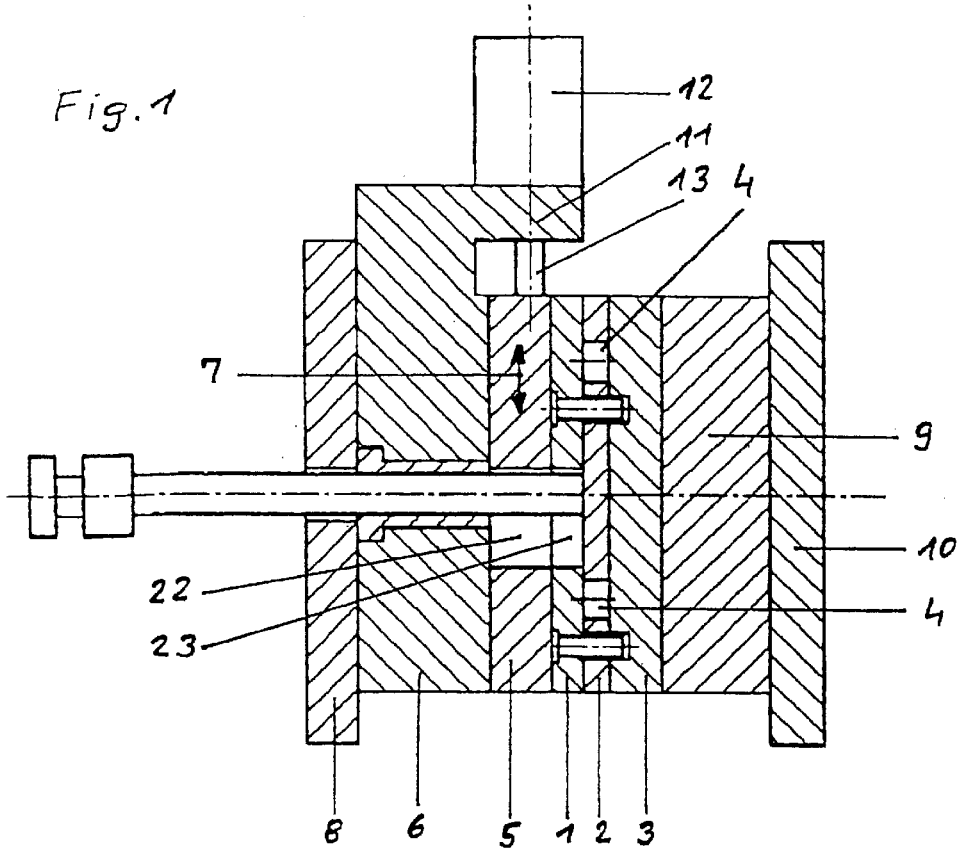
FIG. 1 shows a mold as claimed in the invention in the closed state.

FIGS. 1 to 4 show in highly schematic form an injection mold which has a first die plate 1, a backing plate 2 and a second die plate 3. In the backing plate 2 two mold cavities 4 are shown schematically and they can of course also partially extend into the die plates 1 and 3. The die plate 1 is attached to a carrier plate 5 which for its part is movably supported on a cooling plate 6 in the direction of the double arrow 7. The cooling plate 6 in turn is attached to a support 8 of the machine frame. Accordingly the second die plate 3 is also attached via a cooling plate 9 to a support 10 of the machine frame.

Details of the mold, such as for example injection nozzles for the material, cooling holes, insulating plates and the like are not shown in the drawings, since they can be made in the conventional manner and are not important for understanding of this invention.

Figure 2:
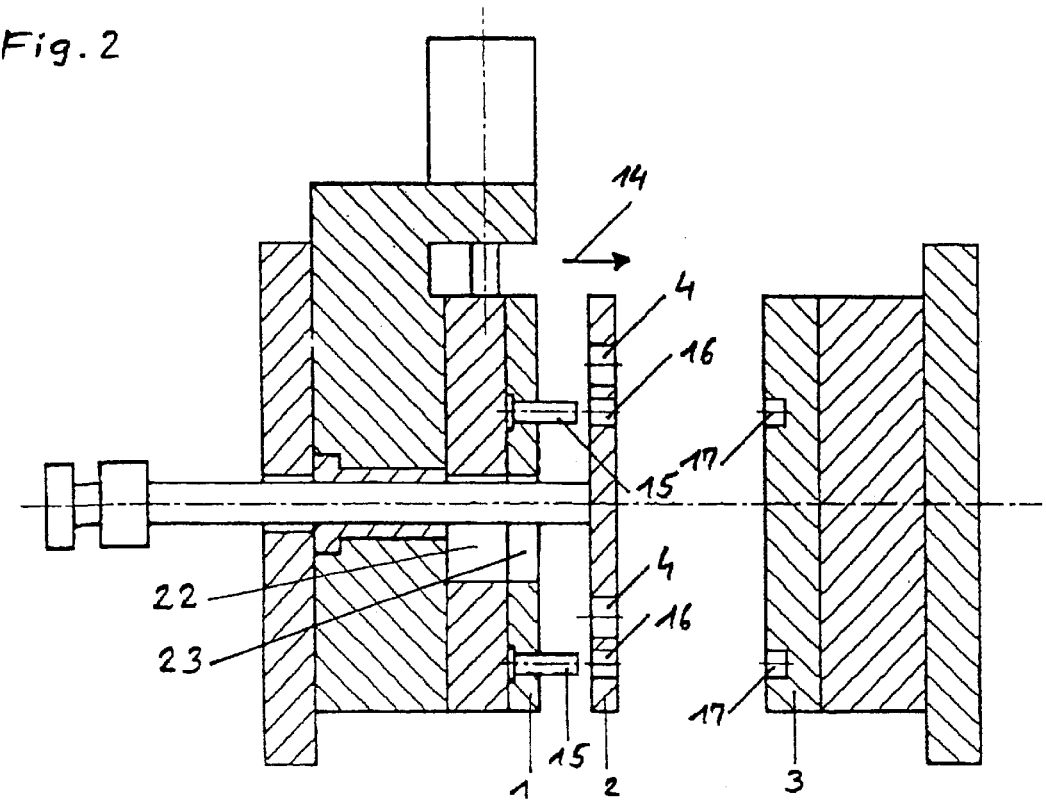
FIG. 2 shows the mold in the opened state.

To move the carrier plate 5, to one projection 11 of the cooling plate 6 a double-acting compressed air cylinder 12 is attached with a piston rod 13 which is connected to the carrier plate 5. The mold is opened by moving the die plates 1 and 3 apart into the position shown in FIG. 2 via a drive of the injection molding machine which is not shown. During opening of the mold by moving the die plates 1 and 3 apart, either at the same time or subsequently the backing plate 2 is advanced in the direction of the arrow 14 until the position which is shown in FIG. 2 is reached. The drive of the backing plate 2 takes place via a rod 20 which is connected via a coupling 21 to a drive of the injection molding machine which is not shown. So that the movement of the die plate 1 and the carrier plate 2 is not hindered by the rod 20, they have recesses 22, 23 which are similar to elongated holes and through which the rod 20 projects. In the position which is shown in FIG. 2 the ejector pins 15 which are attached in the die plate 1 are free, i.e. they are no longer held in the recesses 16 in the backing plate 2 or in the recesses 17 in the die plate 3.

In this position of the backing plate 2 and the die plate 3, the die plate 1 with the carrier plate 5 can be pushed by activation of the compressed air cylinder 12 until it reaches the position shown in FIG. 3 in which the pins 15 are positioned in front of the mold cavities 4 in the backing plate 2 in which the injection moldings are located. By subsequently withdrawing the backing plate 2 in the direction of the arrow 18 (FIG. 4) the injection moldings 19 are ejected by the pins 15 from the mold chambers 4.

Closing of the mold takes place such that proceeding from FIG. 4 the backing plate 2 is again moved forward until the position which is shown in FIG. 3 is reached, whereupon the die plate 1 with the carrier plate 5 is moved back into the position which is shown in FIG. 2 and then the backing plate 2 and the die plates 1 and 3 are moved together until again the position shown in FIG. 1 is reached, in which in a new cycle again the material can be injected into the mold cavities 4.

In an embodiment which is not shown in the drawings, the pins which are rigidly attached in the die plate 1 can also be replaced by elastically supported pins which are loaded against the backing plate 2 by compression springs which are located on their back, i.e. between the pins and the carrier plate 5. The recesses 16, 17 in the backing plate 2 and the die plate 3 can be omitted in this case, since the pins are pressed into the die plate 1 against the force of the springs when the backing plate 2 is withdrawn or the mold is closed and thus are lowered fully in the die plate. The force of the springs is thus such that on the one hand a significantly increased expenditure of force is not required for withdrawing the backing plate 2, on the other hand however reliable ejection of the injection moldings 19 from the backing plate 2 is ensured.

What is claimed:

1. An injection mold comprising:
   a first die plate;
   a second die plate;
   at least one backing plate held between the first and second die plates and border at least one mold cavity;
   means for opening the mold and lifting the backing plate from the die plates;
   means for moving the first die plate in one plane at right angles to the direction of motion of the backing plate; and
   ejectors on the first die plate for ejecting moldings from the cavity.

2. The mold as claimed in claim 1, wherein the ejectors comprise pins rigidly attached to the first die plate and further comprising recesses for the pins on the backing plate and optionally on the second die plate.

3. The mold as claimed in claim 1, wherein the ejectors comprise pins movably held in the first die plate elastically in the direction of motion of the backing plate.

4. The mold as claimed in claim 1, wherein the first die plate is supported to be able to move linearly.

5. The mold as claimed in claim 1, wherein the means for moving the first die plate comprises a pneumatic motor.

6. The mold as claimed in claim 5, wherein the pneumatic motor comprises a double-acting compressed air cylinder.

7. The mold as claimed in claim 2, wherein the first die plate is supported to be able to move linearly.

8. The mold as claimed in claim 3, wherein the first die plate is supported to be able to move linearly.

9. The mold as claimed in claim 2, wherein the means for moving the first die plate comprises a pneumatic motor.

10. The mold as claimed in claim 9, wherein the pneumatic motor comprises a. double-acting compressed air cylinder.

11. The mold as claimed in claim 3, wherein the means for moving the first die plate comprises a pneumatic motor.

12. The mold as claimed in claim 11, wherein the pneumatic motor comprises a double-acting compressed air cylinder.

13. The mold as claimed in claim 4 wherein the means for moving the first die plate comprises a pneumatic motor.

14. The mold as claimed in claim 13, wherein the pneumatic motor comprises a double-acting compressed air cylinder.

15. The mold as claimed in claim 7, wherein the means for moving the first die plate comprises a pneumatic motor.

16. The mold as claimed in claim 15, wherein the pneumatic motor comprises a double-acting compressed air cylinder.

17. The mold as claimed in claim 8, wherein the means for moving the first die plate comprises a pneumatic motor.

18. The mold as claimed in claim 17, wherein the pneumatic motor comprises a double-acting compressed air cylinder.

* * * * *